United States Patent [19]

Lee

[11] Patent Number: 5,187,748

[45] Date of Patent: Feb. 16, 1993

[54] OPTICAL APPARATUS FOR FINGERPRINT IDENTIFICATION SYSTEM

[75] Inventor: Ho-Gyu Lee, Seoul, Rep. of Korea

[73] Assignee: Goldstar, Inc., Seoul, Rep. of Korea

[21] Appl. No.: 733,132

[22] Filed: Jul. 19, 1991

[30] Foreign Application Priority Data

Jul. 21, 1990 [KR] Rep. of Korea ............... 10758/1990

[51] Int. Cl.$^5$ ............................................. G06K 9/74
[52] U.S. Cl. ........................................... 382/4; 356/19
[58] Field of Search ....................... 382/31, 4, 5, 32, 34; 356/71, 19; 350/112, 286; 250/557

[56] References Cited

U.S. PATENT DOCUMENTS

| | | | |
|---|---|---|---|
| 3,771,129 | 11/1973 | McMahon | 382/4 |
| 3,947,128 | 3/1976 | Weinberger et al. | 382/4 |
| 3,975,711 | 8/1976 | McMahon | 382/4 |
| 4,053,228 | 10/1977 | Schiller | 382/4 |
| 4,455,083 | 6/1984 | Elmes | 382/4 |

*Primary Examiner*—Michael T. Razavi
*Assistant Examiner*—Yon Jung

[57] ABSTRACT

An optical apparatus for a fingerprint identification system having a multi-LED for emitting a light, a prism having a slant surface to which a fingerprint being identified is contacted and in which the incident light is absorbed at each ridge but reflected at each valley of the fingerprint, a cover glass functioning as a partial reflecting glass adapted to partially relfect the beam representing a fingerprint image reflected from the prism, a target adapted for focusing a virtual image of the fingerprint thereon, a magnifying glass for magnifying the fingerprint image partially reflected by the cover glass, thereby allowing the user to easily see the fingerprint image, a producing lens for producing the fingerprint image transmitted through the cover glass, and a CCD camera module for converting the fingerprint image produced by the producing lens into an electric signal. The optical fingerprint identification system enables a user to easily adjust the identifying position of the fingerprint improving the accuracy of the fingerprint identification.

1 Claim, 3 Drawing Sheets

OPTICAL APPARATUS FOR FINGERPRINT IDENTIFICATION SYSTEM

BACKGROUND OF THE INVENTION

The present invention relates to an optical apparatus for a fingerprint identification system, and more particularly to an optical apparatus for a fingerprint identification system which improves the accuracy of fingerprint identification by allowing the user to observe his magnified fingerprint image by virtue in a magnifying glass of the optical apparatus.

Conventionally, optical apparatus used for fingerprint identification system identifies a fingerprint by using the properties of emitted beam from a light source, being absorbed at ridges and being reflected at valleys of the fingerprint of an individual finger laid on a slanted surface of a triangular prism.

Known fingerprint identification systems (hereinafter, referred to collectively as "conventional optical apparatus") can be generally classified into two types, a monitor type of optical apparatus, such as for a computer system security, which is connected to a computer system so as to allow the fingerprint to be observed by means of a monitor of the computer system, and an individual type of optical apparatus without using such a monitor. The above types of conventional optical apparatus will be more described in detail as follows.

FIG. 1A is a schematic view showing the construction of a representative embodiment of the known monitor type of optical apparatus. This type of optical apparatus comprises a light source 1 for emitting a light beam to the subject fingerprint "P", a triangular prism 2 including a slant surface 2a of about 45° inclination angle on which the fingerprint "P" is laid, an image producing lens system 3 for receiving the reflected light beam from the valleys of the subject fingerprint laid on the prism 2 and then producing an image of the subject fingerprint "P", an area charge coupled device 4 (hereinafter, referred to simply as "the area CCD") for converting the produced fingerprint image into an electric signal, an amplifying/analyzing circuit 5 (Signal Processing Circuit) for amplifying and then analyzing the electric signal for the subject fingerprint provided by the area CCD 4, and a monitor 6 for displaying the fingerprint image Q in a binary coded form by virtue of the amplifying/analyzing circuit 5.

In identifying operation of the above type of optical apparatus, upon seeing the binary coded fingerprint image Q displayed on the monitor 6 simultaneously with laying his finger being identified on the slant surface 2a of the prism 2, the user slowly slides the finger from the initial position to a subject position consistent with same position as that of the fingerprint registration so that the identifying position of the subject fingerprint can be adjusted to be the registered position and the subject fingerprint can be thus identified as the same fingerprint as that of the registration by virtue of the amplifying/analyzing circuit 5 which amplifies and analyzes the electric signal from the area CCD 4.

On the other hand, the known individual type of optical apparatus has the same elements and operational theory as those of the above mentioned monitor type of optical apparatus shown in FIG. 1A except for including a finger guide member shown in FIG. 1B. The guide member is mounted on the slant surface 2a of the prism 2 and adapted for guiding the finger by virtue of the mechanical structure thereof. Also, this type of optical apparatus has no monitor 6 unlike the above monitor type of optical apparatus. As illustrated, the finger guide member comprises a U-shaped support wall 7 mounted onto the slant surface 2a of the prism 2, a rounded stopper 8 for restraining further movement of the finger F in the X-axial direction on said slant surface 2a, and a pair of movable side guiders 10 and 10' each movably elastically mounted to the U-shaped support wall 7 by virtue of compression coil springs 9, 9' and adapted to elastically restrain the movement of the finger in the Y-axial direction.

In operation, this type of optical apparatus restrains the fingerprint being identified at a position on the slant surface 2a of the prism 2 by means of the stopper 8 and the movable side guiders 10 and 10', and produces the fingerprint image, converts the produced fingerprint image into an electric signal and generates the electric signal binary coded by virtue of the amplifying/analyzing circuit 5, by way of the same process as that of the monitor type of optical apparatus, thereby accomplishing the fingerprint identification.

However, the known monitor type of optical apparatus has a disadvantage in that it displays the binary coded fingerprint image by means of a digital display system, the monitor 8, so that it needs a considerably longer time for adjusting the identifying position of the subject fingerprint to the registered position than that of a direct adjusting process in that the user adjusts the identifying position of the fingerprint simultaneously with seeing the practical fingerprint image. Also, the known individual type of optical apparatus has a disadvantage in that if there an error occurs in the fingerprint identification as a result of a positional difference between the registered fingerprint position and the inputted fingerprint position, it is very difficult to adjust the identifying position of the fingerprint because of the impossibility of confirming the previous identifying fingerprint position.

SUMMARY OF THE INVENTION

It is, therefore, an object of the present invention to provide an optical apparatus for a fingerprint identification system in which the above disadvantages encountered in the prior art may be overcome and which has an optical construction including a low cost cover glass as a partial reflecting glass for allowing the user to see the position of the fingerprint image partially reflected by said cover glass so that the positional error of the fingerprint being identified can be avoided at the inputting stage of the fingerprint information in the fingerprint identification.

The above-mentioned and other objects of the present invention can be accomplished by providing an optical apparatus for fingerprint identification comprising: a multi-LED (multi-Light Emitting Diode) for emitting the light; a prism having a slant surface to which a fingerprint being identified is contacted and in which the incident light is absorbed at each ridge but reflected at each valley of the fingerprint; a cover glass functioning as a partial reflecting glass adapted to partially reflect the beam representing a fingerprint image reflected from said prism; a target adapted for focusing a virtual image of the fingerprint thereon; a magnifying glass for magnifying the fingerprint image partially reflected by said cover glass, thereby allowing the user to easily see said fingerprint image; a producing lens for producing the fingerprint image transmitted through said cover glass; and a CCD camera module for converting the fingerprint image produced by said producing lens into an electric signal.

BRIEF DESCRIPTION OF THE DRAWINGS

The above and other objects, features and other advantages of the present invention will be more clearly understood from the following detailed description taken in conjunction with the accompanying drawings, in which:

FIGS. 1A and 1B each shows a known optical apparatus for a fingerprint identification system, in which:

FIG. 1A is a schematic view showing the construction of a monitor type optical apparatus for a fingerprint identification system;

FIG. 1B is a plane view of a finger guide member of an individual type optical apparatus for a finger identification system;

DETAILED DESCRIPTION OF THE PREFERRED EMBODIMENTS

Figure 1A:
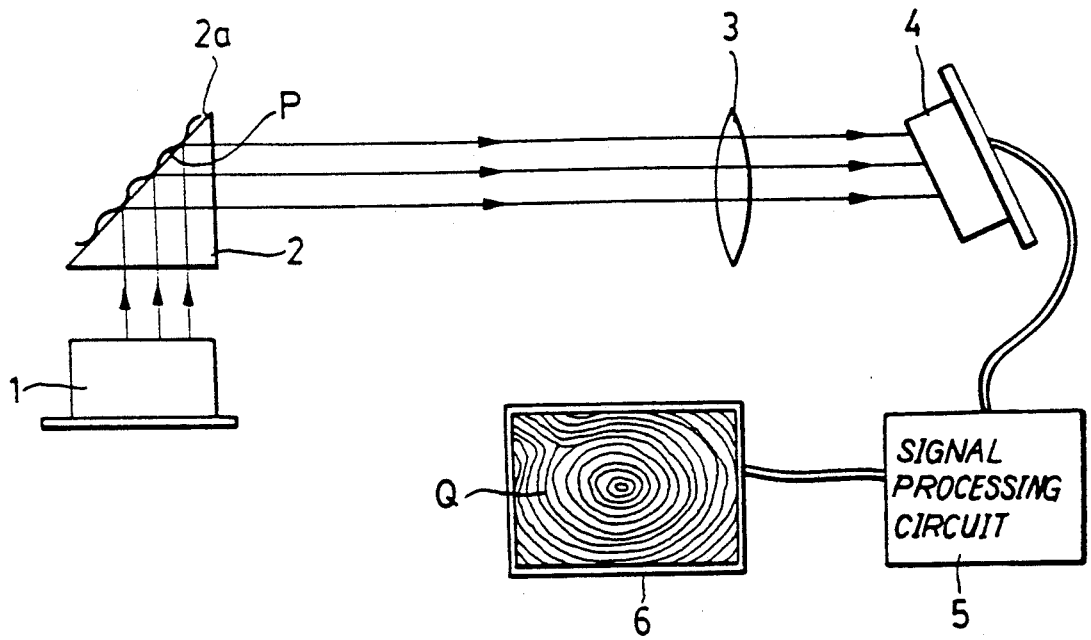
Figure 1B:
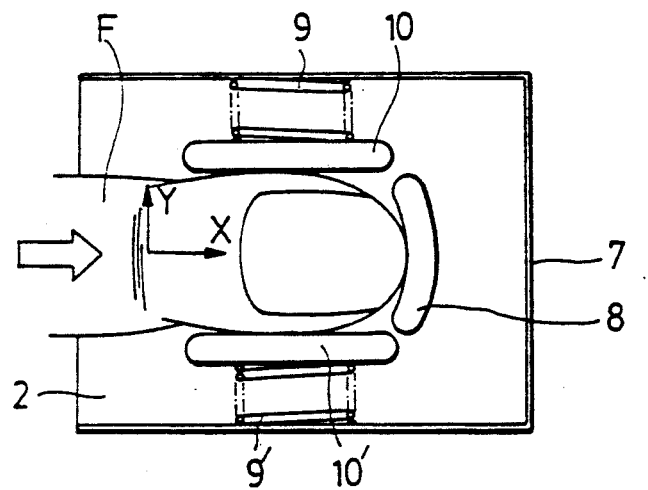
Figure 2:
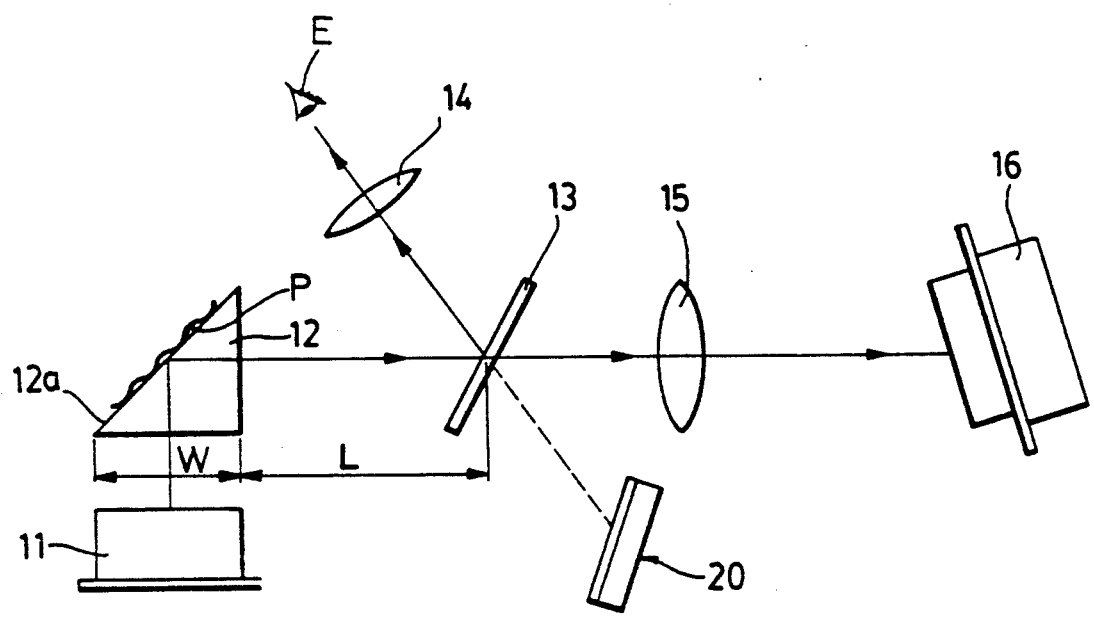
FIG. 2 is a view corresponding to FIG. 1A, but showing the present invention.

Referring first to FIG. 2 which is a schematic view showing the construction of an optical apparatus for a fingerprint identification system in accordance with this invention, the optical apparatus comprises a multi-LED 11 (multi-light emitting diode) used as a light source, a prism 12 having a slant surface 12a and absorbing the incident beam at each ridge but reflecting the incident beam at each valley of the fingerprint, which slant surface 12a has about 45° inclination angle and to which a fingerprint "P" being identified is contacted, a cover glass 13 functioning as a partial reflecting glass adapted to partially reflect the beam representing the fingerprint image reflected by said prism 12, a target 20 provided with a transparent reference cross and adapted for focusing a virtual image of the fingerprint thereon, a magnifying glass 14 for magnifying the fingerprint image partially reflected by said cover glass 13 in order to allow the user to easily see the fingerprint image, a producing lens 15 for producing the fingerprint image transmitted through said cover glass 13, and a CCD camera module 16 for converting the fingerprint image produced by said producing lens 15 into an electric signal.

In the drawing, the letters W and L denote the width of the prism 12 and the length between the centers of the slant surface 12a of the prism 12 and cover glass 13, respectively.

Figure 3:
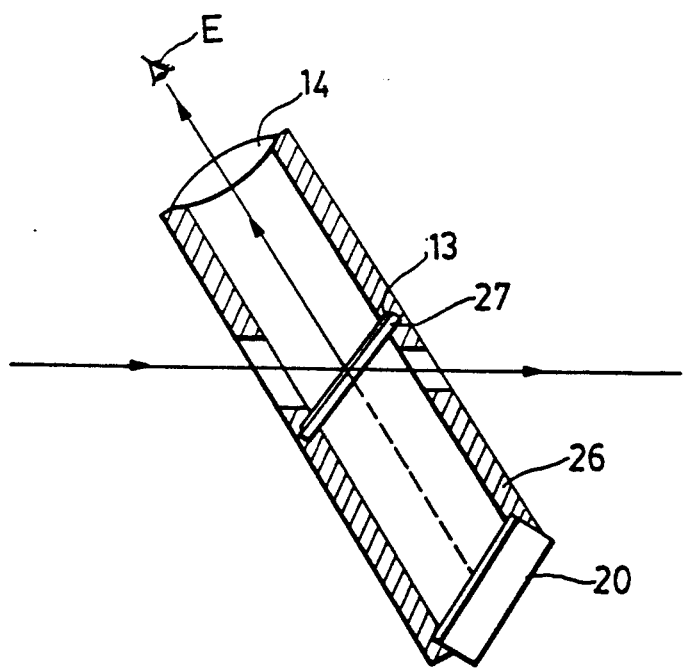
FIG. 3 is a longitudinally sectional view of a shield housing for sealing the magnifying glass, the cover glass and the target of the optical apparatus of FIG. 2.

It is necessary to shield the CCD camera module 16 in order to prevent said module 16 from receiving outside scattered beams except for the beam reflected by the slant surface 12a of the prism 12. Since the magnifying glass 14 of this optical apparatus is disposed so as to be exposed to the outside of the apparatus, an outside light may enter the inside of the optical apparatus by way of said magnifying glass 14 if there is no shielding member, thereby inducing a noise of the CCD camera module 16. Thus, the optical apparatus according to the present invention is provided with a cylindrical shield housing 26 shown in FIG. 3, which housing 26 has a shape capable of sealing the magnifying glass 14, the cover glass 13 and the target 20 but providing a passage for the beam reflected by the prism 12. In addition, the cover glass 13 is mounted to a mounting plate 27 which is detachably attached to the inner surface of said housing 26, thereby facilitating the change of the cover glass 13 when there is a problem, such as breakdown, in said cover glass 13.

Figure 4:
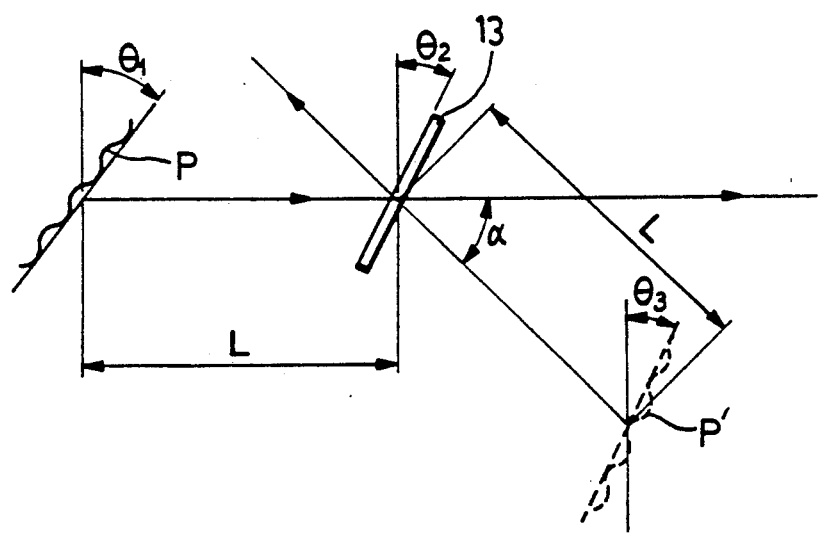
FIG. 4 is a schematic view showing the operational effect of the cover glass of the optical apparatus of FIG. 2.

Turning next to FIG. 4 which is a schematic view showing the operational effect of the cover glass 13 of this optical apparatus, the user practically sees with his eyes "E" the virtual image "P'" of the fingerprint focused on the target 20. The fingerprint "P" contacted to the slant surface 12a of the prism 12 is supposed to be an assumed fingerprint image disposed at a clockwise inclination angle $\theta_1$ to the vertical axis in the atmosphere. Also, the cover glass 13, disposed at a clockwise inclination angle $\theta_2$ to the vertical axis and spaced apart from the center of the fingerprint "P" a distance of L', makes the virtual image of fingerprint "P'" disposed at a clockwise inclination angle $\theta_3$ to the vertical axis at a position spaced apart from the center of said cover glass 13 a distance of L' and at a clockwise inclination angle $\alpha$ to the optical path of the reflected beam.

Here, upon taking account of the general refractive index (n) 1.5 for a glass, the inclination angle $\theta_1$ is formulated as follows:

$$\theta_1 = \cos - (1.5 \tan 45°)$$
$$= 33.7,$$

also because the fingerprint "P" and the virtual image of fingerprint "P'" are symmetrical with each other on the basis of the cover glass 13, the inclination angle $\theta_3$, $\alpha$ and the distance L' are formulated, respectively, as follows:

$$\theta_3 = 2\theta_2 - \theta_1$$
$$= 2\theta_2 - 33.7$$
$$\text{and, } \alpha = 2\theta_2 \text{ and also,}$$
$$L' = L + W/2 \tan 33.7$$
$$= L + 0.33.$$

Figure 5:
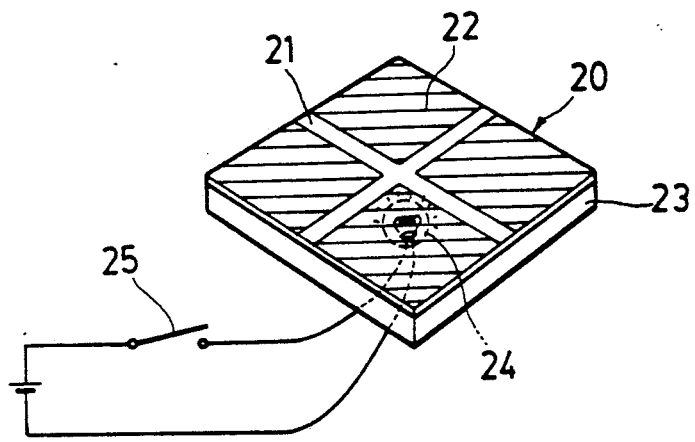
FIG. 5 is a perspective view showing the target of the optical apparatus of FIG. 2.

Additionally, the target 20 comprises a target case 23 and a blue filter 22 covering the target case 23 and colored in black except for a transparent referential cross 21, as shown in FIG. 5. The target 20 is also provided with a LED light source 24 therein, which LED light source 24 can be selectively turned on by virtue of a switch 25 as needed.

The operational effect of the above optical apparatus will be described hereinafter.

Referring again to FIG. 2, the beam emitted from the multi-LED 11 enters the prism 12 in order to be absorbed at each ridge of the fingerprint "P", contacted to the slant surface 12a of the prism 12, but reflected at each valley of the fingerprint "P" not contacted to said slant surface 12a. Thereafter, the reflected beam directs to the cover glass 13.

The cover glass 13 reflects a part of the incident beam, thereby allowing the user's eye "E" to see the virtual image "P'" of the fingerprint by virtue of the magnifying glass 14 simultaneously with adjusting the identifying position of the fingerprint "P" by adjusting the position of the virtual image "P'" of the fingerprint on the basis of the reference cross 21 of the target 20.

At this time, the LED light source 24 is activated using the switch 25 of the target 20 upon laying the finger on the slant surface 12a of the prism 12. Respective images corresponding to the ridges and the valleys of the fingerprint, each said ridge absorbing the incident light of the prism 12 but each said valley reflecting said incident light, are seen as being different from the light of the LED light source 24 transmitting the transparent reference cross 21. Thus, the adjustment of the identifying position of the fingerprint is facilitated.

After adjusting the identifying position of the fingerprint, the LED light source 24 of the target 20 is turned off again using the switch 25 in order to prevent the light of said LED light source 24 to be received by the CCD camera module 16.

The image of the subject fingerprint "P" transmitting through the cover glass 13 is produced by the producing lens 15 and then converted into the electric signal by the CCD camera module 16.

Figure 6:
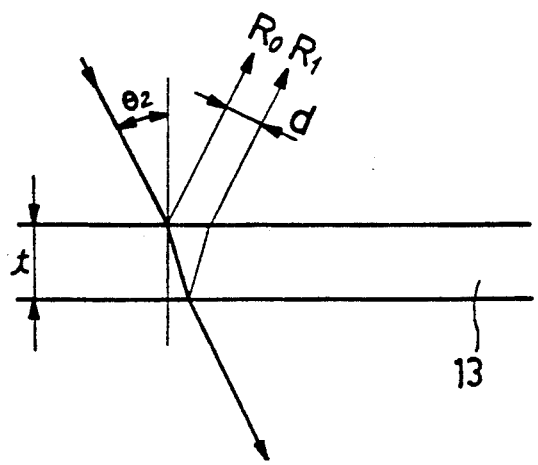
FIG. 6 is a schematic view showing the relation between the double reflection and the thickness of the cover glass of the optical apparatus of FIG. 2.

FIG. 6 which is a schematic view showing the relationship between the double reflection and the thickness "t" of the cover glass 13 of the optical apparatus of the present invention. Respective reflectivities of the front and rear surfaces of said cover glass will be in the ranges of about 4%–5% and about 3.8%–4.5% upon adjusting the angles of incidence of the reflected beam into the cover glass 13 in the range of about 15°–45°, thus the distance "d" between the respective reflected light paths of $R_0$ and $R_1$ is formulated as follows:

$$d = 2 \cdot t \cdot \tan[\sin-(\sin \theta_2/1.5)] \cos \theta_2$$

Therefore, if a cover glass of the thickness "t" of 0.14 mm is used as the cover glass 13, the distance "d" ranges from about 0.047 mm to about 0.106 mm so that the double images of the fingerprint overlapped with each other are nearly seen as an image, thereby preventing the observing confusion which may occur as a result of the overlap.

As described above, the optical apparatus for a fingerprint identification system according to this invention provides an advantage over conventional optical apparatus in that the user can adjust the identifying position of the fingerprint more effectively and efficiently as a result of the optical construction including the cover glass as a partial reflecting glass and including no monitor. Also, the optical apparatus of this invention provides another advantage of improving the accuracy of the fingerprint identification because the previous identifying position of the fingerprint can be referred to for the further identification if the previous identification arrives at error.

Although the preferred embodiments of the present invention have been disclosed for illustrative purpose, those skilled in the art will appreciate that various modifications, additions and substitutions are possible, without departing from the scope and spirit of the invention as disclosed in the accompanying claims.

What is claimed is:

1. An optical apparatus for a fingerprint identification system comprising:

a multi-LED for emitting a light;

a prism having a slant surface to which a fingerprint being identified is contacted and in which the light from said multi-LED is absorbed at each ridge but reflected at each valley of the fingerprint creating a fingerprint image;

a cover glass functioning as a partial reflecting glass adapted to partially reflect the light representing the fingerprint image from said prism;

a target, positioned with respect to said cover glass for receiving the light from said prism and for focusing a virtual image of the fingerprint thereon facilitating proper positioning of the fingerprint on the prism by aligning the virtual image reflected by said cover glass with a reference image produced by said target, said target having, a target case, a blue filter covering said target case for producing a black background except for a transparent reference cross, light means provided in said target case for illuminating the blue filter and reference cross, and a switch adapted to selectively turn on said light means when positioning the fingerprint on the slant surface of the prism and off once the fingerprint is properly positioned;

a magnifying glass for magnifying the virtual image partially reflected by said cover glass, thereby allowing the user to easily see the virtual image;

a producing lens for producing the fingerprint image from said prism as transmitted through said cover glass; and a CCD camera module for converting the fingerprint image produced by said producing lens into an electric signal.

* * * * *